Dec. 2, 1952  J. N. McMILLAN  2,619,852

SHARPENER FOR REVOLVING CUTTER BLADE LAWN MOWERS

Filed Oct. 30, 1951

*Jerry N. McMillan*
INVENTOR.

BY *Glenn L. Fish*

Attorney

Patented Dec. 2, 1952

2,619,852

UNITED STATES PATENT OFFICE 2,619,852

SHARPENER FOR REVOLVING CUTTER BLADE LAWN MOWERS

Jerry N. McMillan, Colville, Wash.

Application October 30, 1951, Serial No. 253,860

1 Claim. (Cl. 76—82.1)

1

My present invention relates to the broad class of tool sharpening devices and more particularly to a sharpener for revolving cutter blade lawn mowers.

One object of my invention lies in the provision of a sharpener for revolving cutter blade lawn mowers which comprises a bar having a cutter bar receiving groove and a dove-tail groove which contains an abrading tool such as a file.

Another object of the invention lies in the provision of a lawn mower sharpener having an abrading tool with an arcuate abrading surface and which is adapted to be securely fastened to a cutter bar of a lawn mower to position the tool for sharpening engagement with the blades of the rotary cutter at the precise position of the stationary cutter bar.

Another object of the invention lies in the provision of a lawn mower sharpener having set bolts adapted to secure the tool to the mower's cutter bar for rigidity, and spring having hooks adapted to catch at the rear edge of the cutter bar to prevent accidental displacement of the sharpener.

Other objects and advantages of the invention will be apparent during the course of the following description.

Figure 1:
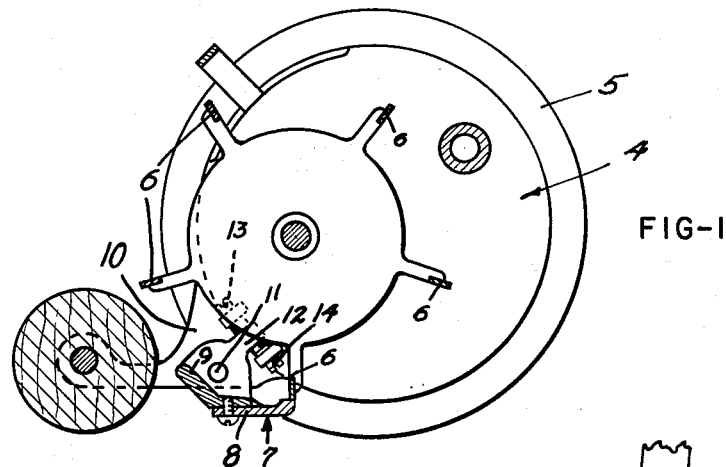
Figure 2:
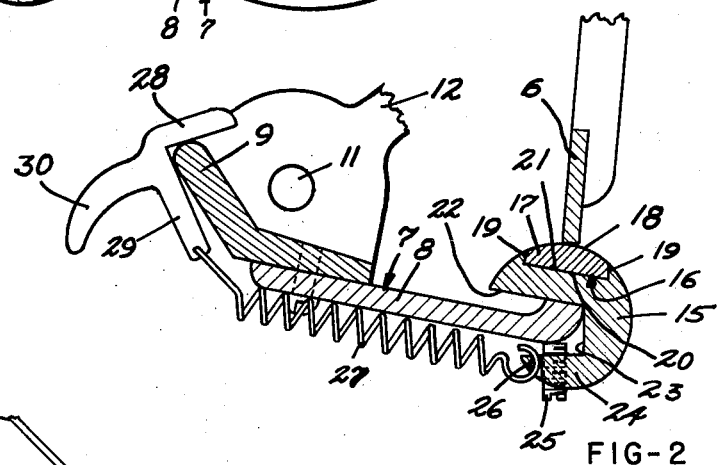
Figure 3:
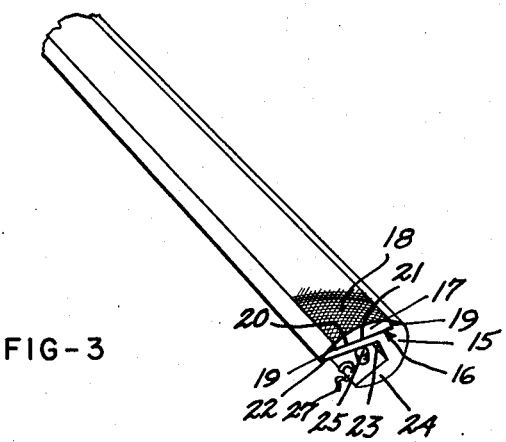

In the accompanying drawings, forming a part of this specification, and in which like numerals are employed to designate like parts, Figure 1 is a cross section of a common lawn mower taken transversely through the rotor and cutter bar, Figure 2 is a fragmentary cross section of a cutter bar of a lawn mower taken upon an enlarged scale and having the sharpener, comprising my invention, attached thereto, and, Figure 3 is a fragmentary perspective view of a portion of my improved sharpener.

Referring now more particularly to the drawings, examination of Figure 1 will show a lawn mower, indicated in general by the numeral 4, which has the usual traction wheels 5 adapted to rotate the revolvable cutter blades 6 which are the object of the sharpening action. A cutter bar 7 is positioned below the revolving cutter blades with minute clearance therebetween. The cutter bar shown is formed of two sections 8 and 9. The section 9 is a yoke which is pivotally mounted on the frame 10 at each end as at 11. An ear 12 extends from the yoke and is positioned between opposed set bolts 13 and 14 carried by the frame and by means of which the yoke may be adjusted to position the cutter bar section 8 in proper relation to the revolving blades 6.

2

I have described one form of cutter bar as shown in the exemplifying drawings, but it will be understood that my sharpener is equally applicable to cutter bars of other design which are adapted for adjustment relative to the revolving blades 6.

The sharpener comprises an elongated body 15 formed substantially crescent-shaped in cross section and having a longitudinally extending dove-tail groove 16 extending its full length. A file or other abrading tool 17 is formed with a transversely arcuate abrading surface 18 and downwardly diverging side edges 19—19 which adapt the tool 17 to be slid longitudinally into the dove-tail groove 16 and be held thereby. The bottom 20 of the dove-tail groove is flat and cooperates with the flat bottom face 21 of the tool 17 to dispose the tool in proper working position.

Spaced downwardly and in a parallel plane with relation to the bottom 20 I have provided a cutter bar engaging shoulder 22 which terminates in an inwardly spaced wall 23, disposed at an approximate 100° angle from the shoulder. At its lower edge the wall 23 terminates in a right angle shelf or lip 24. This construction disposes the upper face of shoulder 22 at an angle to the upper face of lip 24 thus defining a longitudinally extending, inwardly converging, groove in the body 15 at substantially a right angle to the dove-tail groove 16.

Adjacent each end of the body, or as more frequently as desired, vertically positioned internally threaded holes are formed through lip 24 and set bolts 25 are threadedly engaged therein and adapted to be tightened to bear against the cutter bar 8 and secure the sharpener rigidly against vibration or other movement relative to the cutter bar.

Spaced outwardly from said threaded openings, lip 24 is provided with spring securing apertures 26 which are provided for uniting ends of springs 27 to the sharpener body 15. On the opposite ends of springs 27, I have provided hooks 28 disposed at an angle to its respective arm 29 which is secured to the spring. Hooks 28 are adapted to catch over the rear edge of the cutter bar and the springs yieldably secure the sharpener in place. A curved finger 30 enables one to easily apply the hook over the cutter bar and remove it therefrom.

Having thus described my invention, I claim:

A sharpener for revolving cutter blade lawn mowers comprising an elongated body, a longitudinally extending dove-tail groove in the body, an abrading tool in the groove and having an arcuate abrading surface disposed away from the groove, a longitudinally extending inwardly converging cutter bar receiving groove in the body at right angles to said dove-tail groove and defining a lower lip, multiple set bolts threadedly engaged through the lip and communicating with said cutter bar receiving groove for binding the sharpener to a cutter bar and effecting rigidity, apertures in the lip, and springs each having one end secured in one said aperture and adapted to hook over the rear edge of the cutter bar and releasably secure the sharpener thereon.

JERRY N. McMILLAN.

REFERENCES CITED

The following references are of record in the file of this patent:

UNITED STATES PATENTS

| Number | Name | Date |
| --- | --- | --- |
| 1,863,038 | Bradford | June 14, 1932 |
| 1,887,394 | Bailey | Nov. 8, 1932 |
| 1,929,326 | McIlyar | Oct. 3, 1933 |
| 2,412,343 | Lauer | Dec. 10, 1946 |
| 2,484,699 | Feder | Oct. 11, 1949 |